United States Patent
Diehl et al.

(10) Patent No.: US 12,363,105 B2
(45) Date of Patent: Jul. 15, 2025

(54) CODE-BASED TWO FACTOR AUTHENTICATION

(71) Applicants: Sony Group Corporation, Tokyo (JP); Sony Pictures Entertainment Inc., Culver City, CA (US)

(72) Inventors: Eric Diehl, Culver City, CA (US); Chaitanya Krishna Rudrabhatla, Torrance, CA (US)

(73) Assignees: Sony Group Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 407 days.

(21) Appl. No.: 17/850,684

(22) Filed: Jun. 27, 2022

(65) Prior Publication Data

US 2023/0006996 A1    Jan. 5, 2023

Related U.S. Application Data (60) Provisional application No. 63/217,029, filed on Jun. 30, 2021.

(51) Int. Cl.
*H04L 29/06* (2006.01)
*H04L 9/40* (2022.01)

(52) U.S. Cl.
CPC ........ *H04L 63/0853* (2013.01); *H04L 63/083* (2013.01)

(58) Field of Classification Search
None
See application file for complete search history.

(56) References Cited

U.S. PATENT DOCUMENTS 9,438,575 B2    9/2016  Shi
10,742,634 B1 *  8/2020  Shahbazi  .............. H04W 12/77
(Continued)

FOREIGN PATENT DOCUMENTS

EP    2747444 A1    6/2014
JP    2008203914 A    9/2008
(Continued)

OTHER PUBLICATIONS

Paul Wagner, Kris Heid, Jens Heider, Remote WebAuthn: FIDO2 Authentication for Less Accessible Devices, In Proceedings of the 7th International Conference on Information Systems Security and Privacy (ICISSP 2021), pp. 368-375, ISBN: 978-989-758-491-6, Copyright c 2021 by SCITEPRESS—Science and Technology Publications, Lda.

*Primary Examiner* — Jeffery L Williams
(74) *Attorney, Agent, or Firm* — Procopio, Cory, Hargreaves & Savitch LLP (57) ABSTRACT

Authenticating a user account to access a remote service from a user device includes: capturing a machine-readable image code displayed on the user device using a mobile device, wherein the image code is provided by the remote service; extracting and calling a corresponding session code embedded in the image code; determining whether a phone token is in storage; one of: (a) sending the phone token to the remote service, if the phone token is in the storage; or (b) prompting a user to enter credentials including username and password and sending the entered credentials to the remote service, if the phone token is not in the storage; and receiving access to the remote service for the user device, when the session code is valid and either the credentials are valid or the phone token is confirmed.

5 Claims, 4 Drawing Sheets

(56) References Cited

U.S. PATENT DOCUMENTS

| | | | | |
|---|---|---|---|---|
| 11,032,275 | B2* | 6/2021 | Hunt | H04L 63/083 |
| 11,134,071 | B2* | 9/2021 | Kumar | H04L 63/0807 |
| 11,876,798 | B2* | 1/2024 | Suresh | H04L 63/0853 |
| 12,149,614 | B2* | 11/2024 | Murdoch | H04L 63/123 |
| 2013/0262857 | A1 | 10/2013 | Neuman | |
| 2014/0096220 | A1 | 4/2014 | Da Cruz Pinto | |
| 2019/0173994 | A1* | 6/2019 | Ivashyn | G06F 21/41 |
| 2019/0327223 | A1* | 10/2019 | Kumar | H04L 63/0853 |
| 2020/0112560 | A1* | 4/2020 | Hunt | G06F 21/31 |
| 2020/0162255 | A1* | 5/2020 | Hunt | H04L 63/083 |
| 2020/0374284 | A1* | 11/2020 | Suresh | H04L 63/0861 |
| 2022/0182369 | A1* | 6/2022 | Eisen | H04W 12/068 |
| 2023/0006996 | A1* | 1/2023 | Diehl | G06F 21/35 |
| 2023/0368653 | A1* | 11/2023 | Hatambeiki | H04N 21/43615 |
| 2024/0244041 | A1* | 7/2024 | Garg | H04L 41/0813 |
| 2024/0314378 | A1* | 9/2024 | Hou | H04N 21/2668 |

FOREIGN PATENT DOCUMENTS

| | | | |
|---|---|---|---|
| JP | 2011141785 | A | 7/2011 |
| JP | 2014128928 | A | 7/2014 |
| JP | 2015162765 | A | 9/2015 |
| JP | 2019049986 | A | 3/2019 |
| JP | 6891356 | B1 | 6/2021 |

* cited by examiner

CODE-BASED TWO FACTOR AUTHENTICATION

CROSS-REFERENCE TO RELATED APPLICATIONS

This application claims the benefit of priority under 35 U.S.C. § 119(e) of U.S. Provisional Patent Application No. 63/217,029, filed Jun. 30, 2021, entitled "QR Code-Based Two Factor Authentication". The disclosure of the above-referenced application is incorporated herein by reference.

BACKGROUND

Field

The present disclosure relates to two-factor authentication, and more specifically, to authenticating a user account to access a remote service at a user device.

Background

Many streaming services running on smart TVs, Set-Top Boxes, or dedicated devices such as Apple TV™ require user authentication. This authentication is often not user-friendly, especially if authentication is mandatory for each new access. For example, inputting a complex password can quickly become a tedious task when using only a remote control.

Most conventional solutions use the traditional username-password combination. However, this combination is not user-friendly and may even be insecure. Some solutions use a traditional Two-Factor Authentication (2FA) with a registered phone. The service sends a code to the user's registered mobile device via SMS. This solution still requires the users to enter their credentials via a remote control. Other solutions register the device for the user by sending a code to an already-registered device. Again, the user must enter credentials using the remote control.

SUMMARY

The present disclosure provides for authenticating a user account to access a remote service.

In one implementation, a method for authenticating a user account to access a remote service from a user device is disclosed. The method includes capturing a machine-readable image code displayed on the user device using a mobile device, wherein the image code is provided by the remote service. The method also includes extracting and calling a corresponding session code embedded in the image code. The method also includes determining whether a phone token is in storage; one of: (a) sending the phone token to the remote service, if the phone token is in the storage; or (b) prompting a user to enter credentials including username and password and sending the entered credentials to the remote service, if the phone token is not in the storage. The method further includes receiving access to the remote service for the user device, when the session code is valid and either the credentials are valid or the phone token is confirmed.

In another implementation, a remote service method for authenticating a user account to access a remote service at a user device is disclosed. The method includes receiving a session code from a mobile device, determining whether the session code matches one of pending session codes in a set structure; and deleting the matched session code from the set structure. The method also includes receiving a phone token or credentials of the user account; and one of: (a) determining the validity of the credentials, if the credentials are received; or (b) determining whether the phone token is present in a credential database of the remote service, if the credentials are not received. The method further includes generating and sending a phone token to the user device when the credentials are determined to be valid; and granting access to a remote service application installed on the user device for the remote service using the credentials.

In yet another implementation, a system for authenticating a user account to access a remote service includes a user device, a mobile device, and a remote service. The user device includes a remote service application to display a machine-readable image code provided by the remote service. The mobile device captures the machine-readable image code to access the remote service, extracts and calls a corresponding session code embedded in the machine-readable image code. The mobile device also sends the extracted session code and one of (a) a phone token in storage of the mobile device, or (b) credentials obtained from a user, to the remote service to receive access to the remote service for the user device, when either the credentials are valid or the phone token is confirmed.

Other features and advantages should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended drawings, in which like reference numerals refer to like parts, and in which.

DETAILED DESCRIPTION

As described above, user authentication for many streaming services is often not user-friendly and can quickly become a tedious task when using only a remote control. Thus, a need exists for a simple technique to authenticate a user account.

Certain implementations of the present disclosure provide methods and systems for authenticating a user account. In one implementation, a server system provides a machine-readable code (e.g., a quick response (QR) code) including a session code to a user device. A user captures the image of the QR code from the user device using a mobile device and extracts the session code from the QR code. The mobile device returns the session code to the server system. The server system then authenticates the received information to grant access to the user device (including a display) to a service provided by the server system. In one example implementation, the server system provides a content streaming service. In another example implementation, the display device is a television connected to the remote service system through the Internet.

Features provided in implementations can include, but are not limited to, one or more of the following items:
(a) creating a session code and creating an image code (such as a QR code) including the session code;
(b) extracting a session code from a captured image of an image code;
(c) creating a token for a mobile device to identify the mobile device for future transactions; and
(d) authenticating a user device using a session code and user credentials or using a session code and a token.

After reading the below descriptions, it will become apparent how to implement the disclosure in various implementations and applications. Although various implementations of the present disclosure will be described herein, it is understood that these implementations are presented by way of example only, and not limitation. As such, the detailed description of various implementations should not be construed to limit the scope or breadth of the present disclosure.

In one implementation, a content service provides streaming video by sending video data from a server system (e.g., a remote service) over the Internet to user devices, such as televisions, computers, or game consoles. In one implementation, a user device includes an application that connects with the remote/streaming service. The user launches the application to access the remote/streaming service.

To access the streaming service through a television, for example, a user authenticates the television with the server system using a mobile device. The user requests access to the service through the television (connected to the Internet). The server system creates a session code and creates a QR code indicating the session code. The server system sends the QR code to the television through the Internet. The television displays the received QR code. The user captures an image of the QR code using the camera of a mobile device. The mobile device extracts or derives the session code from the QR code image.

In one implementation, the mobile device uses the session code and token received from the server system. If the mobile device does not have a token, the mobile device sends the session code to the server system without a token. The server system verifies the session code and requests user credentials from the mobile device (e.g., username and password). The mobile device requests and receives the user credentials from the user (if not already stored) and then sends the credentials to the server system. The server system verifies the credentials. After verifying, the server system grants access to the streaming service to the television. The authenticated television can request, receive, and display video data from the server system. The server also creates and stores a token associated with the user (e.g., user name), and sends the token to the mobile device. The mobile device stores the token for future requests.

If the mobile device has previously received a token from the server system, the mobile device sends the session code and token to the server system. The server system verifies the session code and token. After verifying, the server system grants access to the television to the streaming service. The authenticated television can request, receive, and display video data from the server system.

Figure 1:
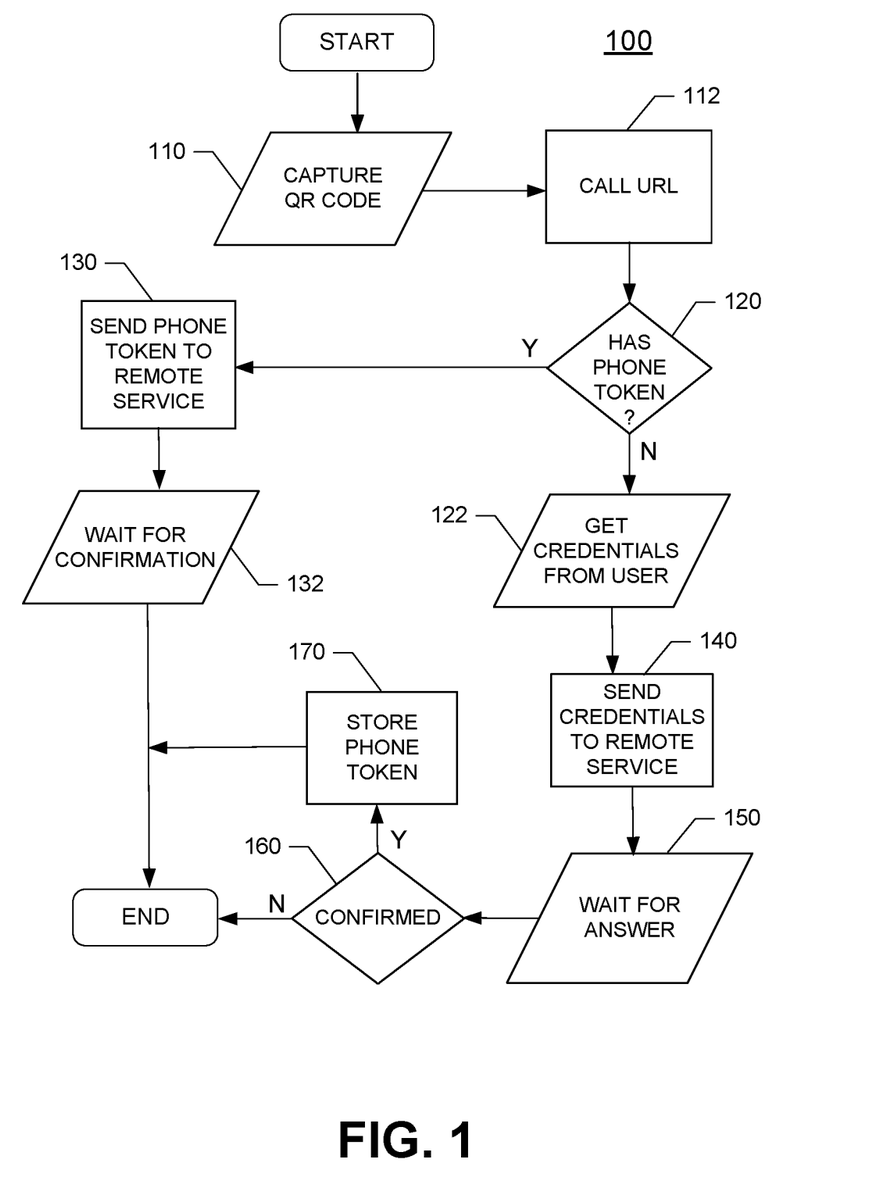
FIG. 1 is a flow diagram of a process for authenticating a user account to access a remote service at a user device in accordance with one implementation of the present disclosure.

FIG. 1 is a flow diagram of a process 100 for authenticating a user account to access a remote service at a user device in accordance with one implementation of the present disclosure. In one implementation, to access the remote service using the user device, the user captures an image code (e.g., the QR code) displayed on the user device, at block 110, using a mobile device. The image code may include other codes or tags such as bar codes, near-field communication (NFC) tags, SnapTags, and other similar items including Image Recognition, and Bluetooth beacons. In one implementation, the user device is one of television, computer, or game console. In one implementation, the QR code is displayed by a remote service application installed on the user device.

Once the QR code has been captured, at block 110, the mobile device extracts and calls a corresponding location code (e.g., uniform resource locator (URL)) embedded in the QR Code, at block 112. This is a feature often present in modern Operating Systems of mobile devices. In some implementations, the mobile device may also extract and send a corresponding session code to the remote service. The mobile device checks to determine, at block 120, whether it has a phone token in its storage. If the mobile device determines that it already has the phone token, it sends the phone token to the remote service, at block 130, and waits for a confirmation, at block 132.

Otherwise, if the mobile device determines that it does not have the phone token, the mobile device prompts the user, at block 122, to enter the credentials including the username and the password. The mobile device then sends the received credentials to the remote service, at block 140. The mobile device then waits, at block 150, for the token answer that holds the phone token. Once the mobile device receives the confirmation (along with the phone token if the mobile device does not already have one stored), at block 160, it stores the phone token in its secure storage, at block 170. Further, once the mobile device receives the confirmation, the server system grants access to the streaming service to the user device. Thus, the authenticated user device can request, receive, and display video data from the remote service.

In a particular implementation, a method for authenticating a user account to access a remote service from a user device is disclosed. The method includes: capturing a machine-readable image code displayed on the user device using a mobile device, wherein the image code is provided by the remote service; extracting and calling a corresponding session code embedded in the image code; determining whether a phone token is in storage; one of: (a) sending the phone token to the remote service, if the phone token is in the storage; or (b) prompting a user to enter credentials including username and password and sending the entered credentials to the remote service, if the phone token is not in the storage; and receiving access to the remote service for the user device, when the session code is valid and either the credentials are valid or the phone token is confirmed.

In one implementation, the machine-readable image code includes a quick response (QR) code. In one implementation, the user device is one of television, computer, or game console. In one implementation, the method further includes displaying the machine-readable image code by a remote service application installed on the user device. In one implementation, the method further includes storing the phone token in the storage of the mobile device when the phone token is received from the remote device.

Figure 2:
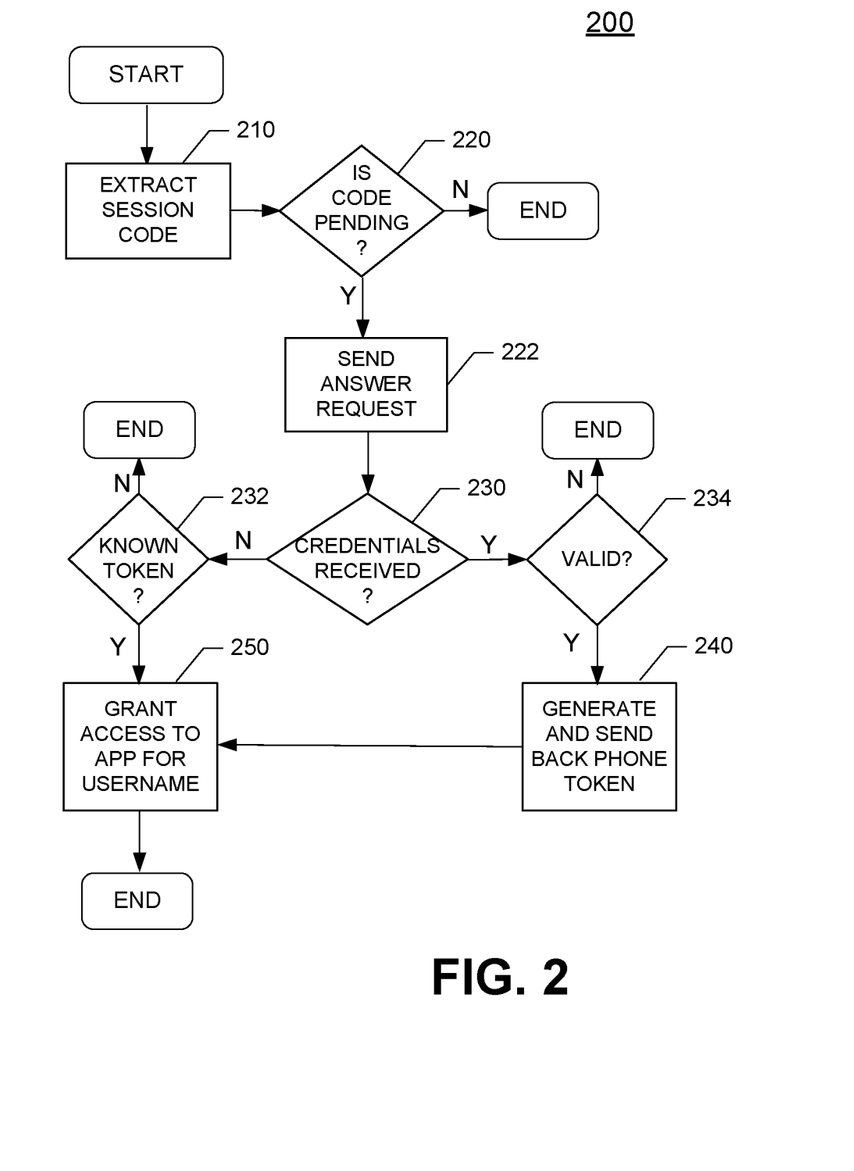
FIG. 2 is a flow diagram of a remote service process for authenticating a user account to access a remote service in accordance with one implementation of the present disclosure.

FIG. 2 is a flow diagram of a remote service process 200 for authenticating a user account to access a remote service in accordance with one implementation of the present disclosure. Initially, to authenticate the user account, the remote service performs the following steps: (a) generates a session code (e.g., a 256-bit nonce session code) and stores the code in a set structure; (b) generates a QR code with the stored session code (e.g., defined by URL1base64, wherein base64 encodes a binary number into a string following the RFC2045 standard); and (c) sends the generated QR code to a remote service application installed on the user device, as stated above.

In the illustrated implementation of FIG. 2, the remote service receives the QR code sent by the mobile device and extracts a session code (e.g., by decoding the base64-encoded code), at block 210. The remote service determines, at block 220, whether the extracted code is one of the pending session codes. If the remote service determines, at block 220, that the retrieved code is one of the pending session codes, it deletes the corresponding session code from the set structure. The remote service then sends a request answer message to the mobile device, at block 222, to provide the credentials (e.g., username and password) of the user.

If the remote service determines, at block 230, that the mobile device answered with credentials, the remote service then checks the validity of the credentials, at block 234. In one implementation, the remote service validates the credentials by calculating saltedPassword and checking whether the pair {username, saltedPassword} is in the credential database of the remote service. In one implementation, saltedPassword=SHA512 (password|salt), wherein salt is a 512-bit random number. If the remote service determines that the credentials are valid, at block 234, it generates a phone token, at block 240, and sends the generated phone token to the user device. In one implementation, the phone token is Java Web Token (e.g., a 256-bit nonce) containing username. In one implementation, the remote service also stores the phone token in the credential database, for example, as a salted hash. On subsequent uses of the remote service, the mobile device sends both the captured code and the stored phone token for quick access.

Otherwise, if the remote service determines, at block 230, that the mobile device did not answer with credentials, the remote service checks to determine, at block 232, whether the mobile device answered with a phone token and whether the phone token is present in the credential database of the remote service. If it is determined, at block 232, that the mobile device answered with a phone token and the phone token is present in the credential database of the remote service, the remote service may generate a Java Web Token containing the username (related to the phone token) and send it to the user device. It should be noted that the Java Web Token carries only the user name and not the phone token. If the tests at block 232 and block 234 pass (i.e., known token and credential validity tests), the remote service grants access to the application for the username of the user, at block 250. The remote service also sends back the phone token to the mobile device to securely store the phone token in the storage of mobile device, if the mobile phone answered with the credentials because it did not have the phone token.

In one implementation, the remote service adds an expiration time to the session code to provide enhance security. Thus, if the mobile device answers after the expiration time, the authentication may fail. In another implementation, the phone token also has an expiration time. Thus, the presentation of an expired phone token may mandate the mobile device to present a valid username and password. In yet another implementation, the remote service randomly requires the presentation of credentials regardless of the value or freshness of the phone token. In a further embodiment, the remote service limits the number of phone tokens associated with a username.

In one implementation, a remote service method for authenticating a user account to access a remote service from a user device is disclosed. The method includes: receiving a session code from a mobile device; determining whether the session code matches one of pending session codes in a set structure; deleting the matched session code from the set structure; receiving a phone token or credentials of the user account; one of: (a) determining the validity of the credentials, if the credentials are received; or (b) determining whether the phone token is present in a credential database of the remote service, if the credentials are not received; generating and sending a phone token to the user device when the credentials are determined to be valid; and granting access to a remote service application installed on the user device for the remote service using the credentials.

In one implementation, the method further includes: generating and storing the session code in the set structure; generating a machine-readable image code using the stored session code; and sending the generated machine-readable image code to the remote service application installed on the user device. In one implementation, the credentials include a username and a password, and determining the validity of the credentials includes: salting the password to generate saltedpassword; and checking whether a pair {username, saltedPassword} is in the credential database, wherein saltedPassword is a result of applying a hashing function on combined password and salt, and wherein salt is a random number. In one implementation, the phone token is Java Web Token containing the username. In one implementation, the method further includes storing the phone token in the credential database as a salted hash. In one implementation, the method further includes sending the phone token to the mobile device to store the phone token in storage of the mobile device. In one implementation, the session code includes an expiration time to limit the use of the session code. In one implementation, the phone token includes an expiration time to limit the use of the phone token.

Figure 3:
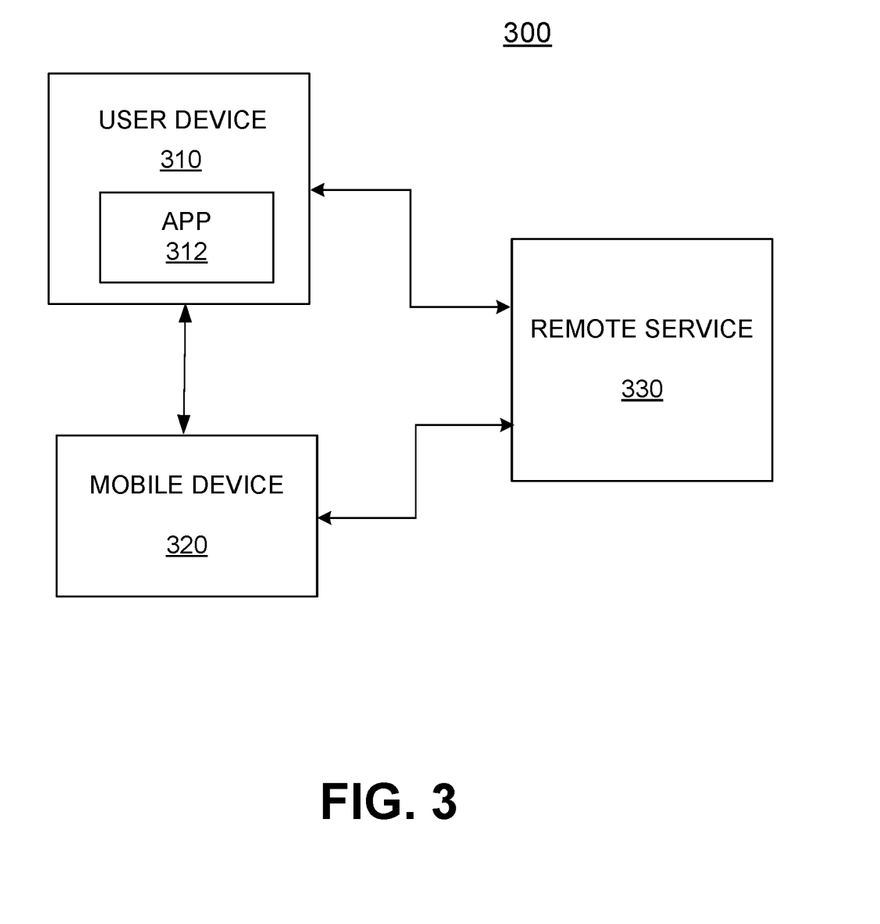
FIG. 3 is a block diagram of a system for authenticating a user account to access a remote service in accordance with one implementation of the present disclosure.

FIG. 3 is a block diagram of a system 300 for authenticating a user account to access a remote service in accordance with one implementation of the present disclosure. In the illustrated implementation of FIG. 3, the system 300 includes a user device 310, a mobile device 320, and a remote service 330. In one implementation, the blocks 320, 330, 340 of the system 300 are configured entirely with hardware including one or more digital signal processors (DSPs), general purpose microprocessors, application specific integrated circuits (ASICs), field programmable logic arrays (FPGAs), or other equivalent integrated or discrete logic circuitry.

In the illustrated implementation of FIG. 3, the mobile device 320 is used to capture the QR code displayed on the user device 310 to access the remote service 330. In one implementation, the user device 310 is one of television, computer, or game console. In one implementation, the QR code is displayed by a remote service application 312 installed on the user device 310. The mobile device 320 extracts and calls the corresponding URL embedded in the QR Code once the QR code has been captured. The mobile device 320 checks whether it has a phone token in its storage. If the mobile device 320 already has the phone token, it sends the phone token to the remote service 330 and waits for a confirmation.

Otherwise, the mobile device 320 prompts the user to enter the credentials including the username and the password, if the mobile device 320 does not have the phone token. The mobile device 320 then sends the received credentials to the remote service 330. The mobile device 320 then waits for the token answer that holds the phone token. Once the mobile device 320 receives the confirmation (along with the phone token if the mobile device does not already have one stored), it 320 stores the phone token in its storage. Further, once the mobile device 320 receives the confirmation, the remote service 330 grants access to the streaming service to the user device 310. Thus, the authenticated user device can request, receive, and display video data from the remote service.

In the illustrated implementation of FIG. 3, the remote service 330 receives the QR code sent by the mobile device 320 and extracts a session code (e.g., by decoding the base64-encoded code). The remote service 330 checks whether the extracted code is one of the pending session codes. The remote service 330 deletes the corresponding session code from the set structure and sends a request answer message to the mobile device 320 to provide the credentials (e.g., username and password) of the user, if the extracted code is one of the pending session codes (and sent without a token). The remote service 330 checks the validity of the credentials, if the mobile device 320 answers with credentials. The remote service 330 generates a phone token and sends the generated phone token to the user device 310, if the credentials are valid. The mobile device 320 sends both the captured code and the stored phone token on subsequent uses of the remote service 330 for quick access.

Otherwise, the remote service 330 checks whether the phone token is present in the credential database of the remote service 320, if the mobile device 320 did not answer with credentials, but with a phone token. The remote service 330 generates a Java Web Token containing the username associated with the phone token and sends it to the user device 310, if the phone token is present in the credential database of the remote service 330. The remote service 330 grants access to the application for the username of the user, if either token test or credential validity test passes. The remote service 330 also sends back the phone token to the mobile device 320 to securely store the phone token in the storage of mobile device 320.

In a particular implementation, a system for authenticating a user account to access a remote service is disclosed. The system includes: a user device including a remote service application to display a machine-readable image code provided by the remote service; and a mobile device to capture the machine-readable image code to access the remote service, the mobile device to extract and call a corresponding session code embedded in the machine-readable image code, the mobile device to send the extracted session code and one of (a) a phone token in storage of the mobile device, or (b) credentials obtained from a user, to the remote service to receive access to the remote service for the user device, when either the credentials are valid or the phone token is confirmed.

In one implementation, the machine-readable image code includes a quick response (QR) code. In one implementation, the user device is one of television, computer, or game console. In one implementation, the system further includes a remote service to receive the location code from the mobile device and extract a session code, the remote service to determine whether the extracted session code matches one of pending session codes in a set structure, wherein the remote service receives the phone token or the credentials of the user account, and either (a) determines the validity of the credentials, or (b) determines the presence of the phone token in a credential database of the remote service, wherein the remote service grants access to the remote service application installed on the user device for the remote service, when either (a) the credentials are valid, or (b) the phone token is in the credential database of the remote service. In one implementation, the session code includes an expiration time to limit the use of the session code. In one implementation, the phone token is Java Web Token containing the username. In one implementation, the phone token includes an expiration time to limit the use of the phone token.

Figure 4A:
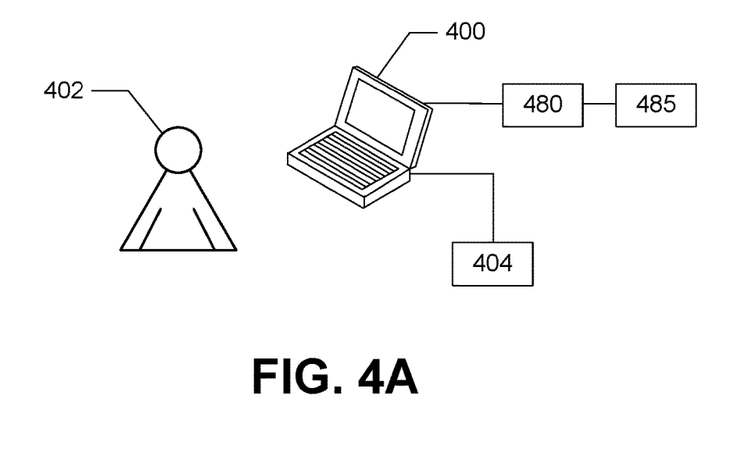
FIG. 4A is a representation of a computer system and a user in accordance with an implementation of the present disclosure.

FIG. 4A is a representation of a computer system 400 and a user 402 in accordance with an implementation of the present disclosure. The user 402 uses the computer system 400 to implement an authentication application 490 for authenticating a user account to access a remote service with respect to the processes 100, 200 of FIGS. 1 and 2, and the system 300 of FIG. 3.

Figure 4B:
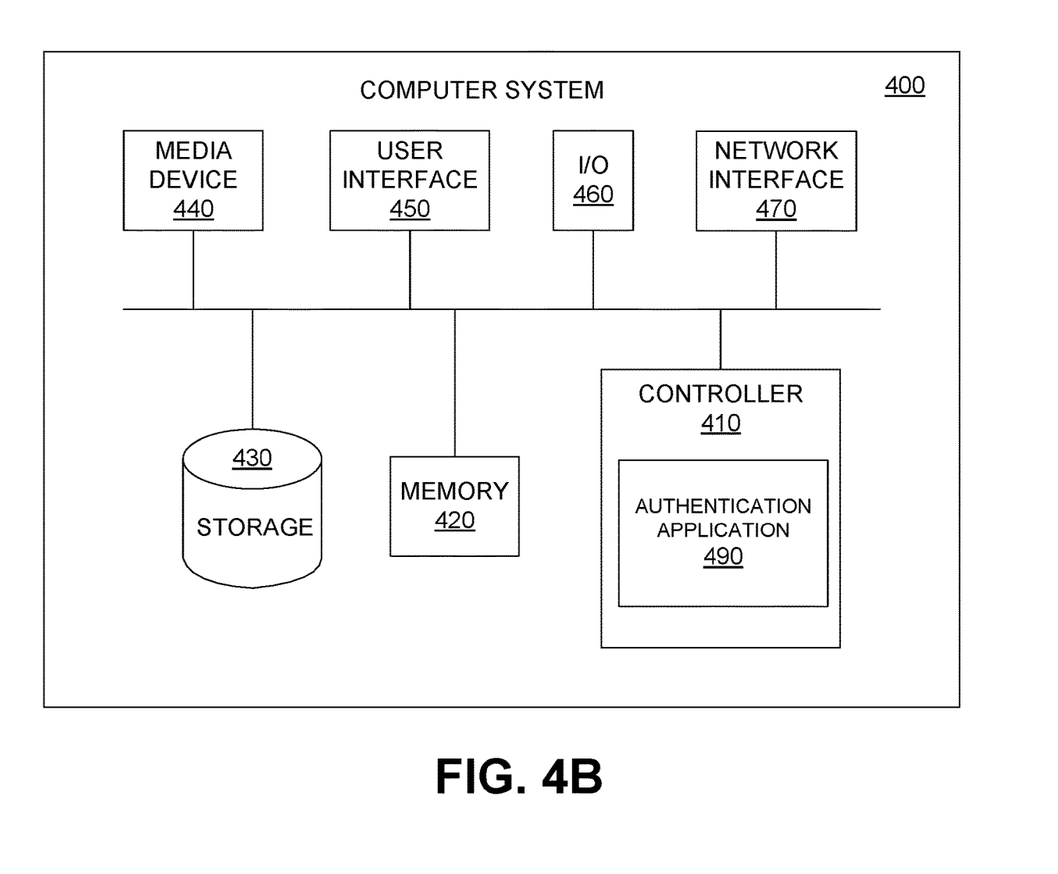
FIG. 4B is a functional block diagram illustrating the computer system hosting the authentication application in accordance with an implementation of the present disclosure.

The computer system 400 stores and executes the authentication application 490 of FIG. 4B. In addition, the computer system 400 may be in communication with a software program 404. Software program 404 may include the software code for the authentication application 490. Software program 404 may be loaded on an external medium such as a CD, DVD, or a storage drive, as will be explained further below.

Furthermore, the computer system 400 may be connected to a network 480. The network 480 can be connected in various different architectures, for example, client-server architecture, a Peer-to-Peer network architecture, or other type of architectures. For example, network 480 can be in communication with a server 485 that coordinates engines and data used within the lens parameter shifting application 490. Also, the network can be different types of networks. For example, the network 480 can be the Internet, a Local Area Network or any variations of Local Area Network, a Wide Area Network, a Metropolitan Area Network, an Intranet or Extranet, or a wireless network.

FIG. 4B is a functional block diagram illustrating the computer system 400 hosting the authentication application 490 in accordance with an implementation of the present disclosure. A controller 410 is a programmable processor and controls the operation of the computer system 400 and its components. The controller 410 loads instructions (e.g., in the form of a computer program) from the memory 420 or an embedded controller memory (not shown) and executes these instructions to control the system, such as to provide the data processing. In its execution, the controller 410 provides the authentication application 490 with a software system. Alternatively, this service can be implemented as separate hardware components in the controller 410 or the computer system 400.

Memory 420 stores data temporarily for use by the other components of the computer system 400. In one implementation, memory 420 is implemented as RAM. In one implementation, memory 420 also includes long-term or permanent memory, such as flash memory and/or ROM.

Storage 430 stores data either temporarily or for long periods of time for use by the other components of the computer system 400. For example, storage 430 stores data used by the authentication application 490. In one implementation, storage 430 is a hard disk drive.

The media device 440 receives removable media and reads and/or writes data to the inserted media. In one implementation, for example, the media device 440 is an optical disc drive.

The user interface 450 includes components for accepting user input from the user of the computer system 400 and presenting information to the user 402. In one implementation, the user interface 450 includes a keyboard, a mouse, audio speakers, and a display. In another implementation, the user interface 450 also includes a headset worn by the user and used to collect eye movements as user inputs. The controller 410 uses input from the user 402 to adjust the operation of the computer system 400.

The I/O interface 460 includes one or more I/O ports to connect to corresponding I/O devices, such as external storage or supplemental devices (e.g., a printer or a PDA). In one implementation, the ports of the I/O interface 460 include ports such as: USB ports, PCMCIA ports, serial ports, and/or parallel ports. In another implementation, the I/O interface 460 includes a wireless interface for communication with external devices wirelessly.

The network interface 470 includes a wired and/or wireless network connection, such as an RJ-45 or "Wi-Fi" interface (including, but not limited to 802.11) supporting an Ethernet connection.

The computer system 400 includes additional hardware and software typical of computer systems (e.g., power, cooling, operating system), though these components are not specifically shown in FIG. 4B for simplicity. In other implementations, different configurations of the computer system can be used (e.g., different bus or storage configurations or a multi-processor configuration).

The description herein of the disclosed implementations is provided to enable any person skilled in the art to make or use the present disclosure. Numerous modifications to these implementations would be readily apparent to those skilled in the art, and the principles defined herein can be applied to other implementations without departing from the spirit or scope of the present disclosure. For example, the remote service can provide various kinds of information and data, such as video data, music data, image data, educational data, or medical data. In other implementations, alternative forms of authentication can be used instead of or in addition to codes, such as biometric information, security questions, or encrypted passwords. Thus, the present disclosure is not intended to be limited to the implementations shown herein but is to be accorded the widest scope consistent with the principal and novel features disclosed herein. Accordingly, additional variations and implementations are also possible.

All features of each of the above-discussed examples are not necessarily required in a particular implementation of the present disclosure. Further, it is to be understood that the description and drawings presented herein are representative of the subject matter which is broadly contemplated by the present disclosure. It is further understood that the scope of the present disclosure fully encompasses other implementations that may become obvious to those skilled in the art and that the scope of the present disclosure is accordingly limited by nothing other than the appended claims.

The invention claimed is:

1. A remote service method for authenticating a user account with a remote service to access the remote service from a user device owned by a user, the method comprising:
   generating and storing a session code in a set structure;
   generating a machine-readable image code by embedding the session code into the machine-readable image code;
   sending the generated machine-readable image code to a remote service application installed on the user device,
   wherein the user device captures the machine-readable image code using a mobile device owned by the user and extracts the session code, and retrieves a phone token of the user account corresponding to the session code in a storage unit of the mobile device, and
   wherein the mobile device sends back the captured machine-readable image code and the phone token to the remote service;
   receiving the captured machine-readable image code and the phone token from the mobile device and extracting the session code from the machine-readable image code at the remote service;
   determining whether the session code extracted at the remote service matches one of pending session codes in the set structure;
   deleting the matched session code from the set structure;
   receiving the phone token of the user account and determining whether the phone token is present in a credential database of the remote service; and
   granting or not granting access to the remote service application installed on the user device for the remote service based on the presence or absence of the phone token in the credential database.

2. The remote service method of claim 1, wherein the phone token is Java Web Token containing a username of the user.

3. The remote service method of claim 1, further comprising
   storing the phone token in the credential database as a salted hash.

4. The remote service method of claim 1, wherein the session code includes an expiration time to limit the use of the session code.

5. The remote service method of claim 1, wherein the phone token includes an expiration time to limit the use of the phone token.

* * * * *